(12) United States Patent
Kwok

(10) Patent No.: US 6,937,416 B2
(45) Date of Patent: Aug. 30, 2005

(54) PROCESS FOR CONTROLLING THE CAPSTAN IN A VIDEO TAPE RECORDER (VTR)

(75) Inventor: Kwong Heng Kwok, Singapore (SG)

(73) Assignee: Thomson Licensing S.A., Boulogne-Billancourt (FR)

( * ) Notice: Subject to any disclaimer, the term of this patent is extended or adjusted under 35 U.S.C. 154(b) by 523 days.

(21) Appl. No.: 09/916,750

(22) Filed: Jul. 27, 2001

(65) Prior Publication Data
US 2002/0012524 A1 Jan. 31, 2002

(30) Foreign Application Priority Data
Jul. 28, 2002 (EP) .............................................. 00402169

(51) Int. Cl.[7] .......................... G11B 15/18; G11B 17/00; G11B 19/02
(52) U.S. Cl. ...................... 360/71; 360/73.01; 360/74.1
(58) Field of Search ................................ 360/71, 73.01, 360/74.1–74.5, 75; 318/119–136, 430–445

(56) References Cited

U.S. PATENT DOCUMENTS

| 4,255,768 A | * | 3/1981 | Kubota ......................... 386/78 |
| 4,463,391 A | | 7/1984 | Takano et al. ............. 360/14.2 |
| 4,910,613 A | | 3/1990 | Mabuchi et al. ........... 360/10.1 |
| 5,140,435 A | | 8/1992 | Suzuki et al. ................ 358/335 |
| 5,313,344 A | * | 5/1994 | Sakaguchi et al. ............ 360/71 |
| 5,448,427 A | * | 9/1995 | Masuda et al. ............ 360/72.1 |
| 5,523,895 A | * | 6/1996 | Takayama ..................... 386/46 |
| 5,563,747 A | * | 10/1996 | Bae ........................... 360/74.2 |
| 5,724,202 A | * | 3/1998 | Choi et al. .................... 360/71 |
| 6,057,973 A | * | 5/2000 | Bar ............................ 360/72.3 |
| 6,275,348 B1 | * | 8/2001 | Walsh ..................... 360/73.08 |

OTHER PUBLICATIONS

R. W. Van Pelt, "Microprocessor Controlled Tape Motion," IEEE Transactions on Magnetics, IEEE Inc. New York, US, vol. MAG17, No. 4, Jul. 1981, pp. 1435–1437. XP002218343 *Search Report Attached.

* cited by examiner

Primary Examiner—David Hudspeth
Assistant Examiner—Jason Olson
(74) Attorney, Agent, or Firm—Joseph S. Tripoli; Harvey D. Fried; Christine Johnson

(57) ABSTRACT

In a video tape recorder (VTR), the capstan draws the tape from which the video signal is reproduced in a forward direction. The following steps are used to control the capstan, applying a torque to the capstan in a backward direction for a first predetermined period of time. Applying a torque to the capstan in the forward direction for a second predetermined period of time and nullifying the motor current. This arrangement is particularly convenient for slow-motion and still-picture modes.

6 Claims, 1 Drawing Sheet

(S1)

(    )

(D)

(S2)

PROCESS FOR CONTROLLING THE CAPSTAN IN A VIDEO TAPE RECORDER (VTR)

FIELD OF THE INVENTION

The invention relates to a process for controlling the capstan in a video tape recorder (VTR).

BACKGROUND OF THE INVENTION

In a video tape recorder (VTR), the tape is drawn by a capstan driven by a capstan motor. For slow-motion reproduction or still-picture reproduction, the tape needs to be stopped accurately so that the magnetic heads on the rotating drum are in correspondance with the track where the image is recorded on the tape, as described for instance in EP 0 849 730 A2.

In order to stop the motion of the capstan (and thus the tape), it has already been proposed, for instance in U.S. Pat. No. 4,670,694 to reverse the control direction of the capstan in a first step and to set to zero the current in the motor in a second step.

However, this solution has not proved sufficiently accurate, notably because the capstan could continue turning backwards by inertia from the first step.

SUMMARY OF THE INVENTION

In order to solve this problem, the invention proposes a process for controlling a capstan in a video tape recorder, the capstan being able to rotate driven by a motor in a forward direction to draw a tape from which a video signal is reproduced, including the following successive steps:

applying a torque to the capstan in a backward direction for a first predetermined period of time;

applying a torque to the capstan in the forward direction for a second predetermined period of time;

nullifying the motor current.

Advantageous features of the invention are as follows:

the first period of time lasts longer than 5 times the second period Of time;

the second period of time lasts between 0.5 ms and 5 ms;

the second period of time lasts between 1 ms and 2 ms;

the first period of time lasts between 5 ms and 25 ms;

the first period of time lasts between 12 ms and 16 ms;

the motor is controlled by a control current and a control rotation direction, the control current is strictly positive during the first period of time and during the second period of time, the control rotation direction is set backward during the first period of time and the control rotation direction is set forward during the second period of time;

the motor is fed by a drive current, the drive current is not null and has a first given sign during the first period of time and the drive current is not null and has a second sign opposite said first sign during the second period of time.

The invention thus proposes a process for controlling a capstan in a video tape recorder, the capstan being driven by a motor and drawing a tape from which a video signal is reproduced, including the following successive steps:

rotating the torque in a first direction;

applying a torque to the capstan in a second direction opposite the first direction for a first predetermined period of time;

applying a torque to the capstan in the first direction for a second predetermined period of time;

nullifying the motor current.

Preferably, the torque is applied in the second direction when a predetermined period of time has elapsed after a control pulse is detected by a control pulse sensor. According to this last solution, the steps can be described as follows:

rotating the capstan in a first direction;

when a first predetermined period of time has elapsed after a control pulse is detected by the control pulse sensor, applying a torque to the capstan in a second direction opposite the first direction for a second predetermined period of time;

applying a torque to the capstan in the first direction for a third predetermined period of time;

nullifying the motor current.

BRIEF DESCRIPTION OF THE DRAWINGS

The invention and other features thereof will be better understood in the light of the following description made with reference to the attached drawings wherein.

DETAILED DESCRIPTION OF PREFERRED EMBODIMENTS

Figure 1:
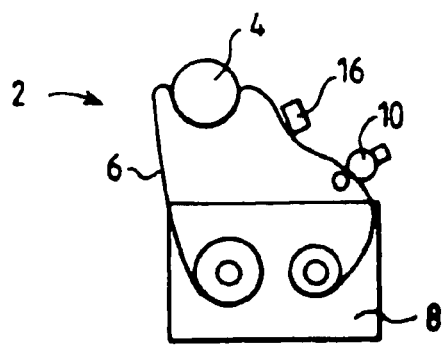
FIG. 1 represents schematically the main elements of a video tape recorder.

FIG. 1 represents a video tape recorder (VTR) 2 comprising a rotating drum 4 carrying magnetic heads to read a magnetic signal recorded on slanted tracks on a tape 6. The tape 6 is carried in a cassette 8 which is inserted in the VTR 2.

A capstan 10 draw the tape 6 during reproduction modes. The capstan 10 is driven by a motor 12 and its motion is measured by a capstan sensor 14 generating pulses (called FG pulses) with a frequency increasing with the rotation speed of the capstan 10.

A control pulse sensor 16 is also provided. The control pulse sensor 16 detects control pulses which are recorded on the tape (during a previous recording mode) in order to indicate the position of the tracks on the tape during reproduction.

Figure 2:
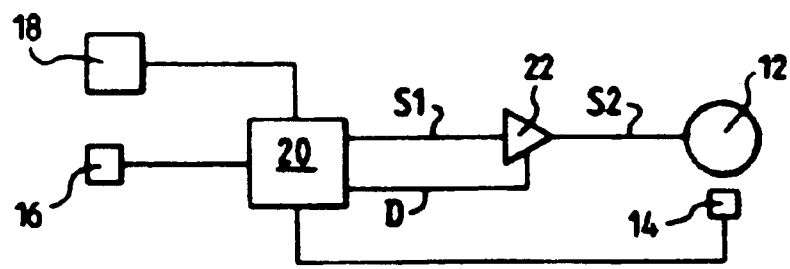
FIG. 2 is a diagram of a circuit used by the invention.

Based on instructions from the user received through a user interface circuit 18 (for instance an infrared receiver detecting instructions from a remote-controller), a control circuit 20 sends operating instructions to the capstan motor 12 on a first wire SI representing the control current of the motor 12 and on a second wire D representing the control rotation direction of the motor 12 (see FIG. 2).

These control current and control rotation direction are combined in an amplifier 22 to form a drive current on a wire S2 which generates a torque (or rotational acceleration) in the motor 12.

It is important to note that the control rotation direction represents the direction of the torque generated by the motor and not directly the direction of rotation of the motor. Of course, if the same control rotation direction is applied for a period of time, the direction of rotation of the motor will follow the control rotation direction.

As can be seen from FIG. 2, the VTR 2 includes a single capstan sensor 14 (which allows a cost reduction compared to known systems with two 90°-phase-shifted capstan sensors) and is consequently unable to detect the rotation direction of the capstan 10 nor a change in the rotation direction.

The control circuit 20 receives the control pulses signal from the control pulse sensor 16 in order to Locate the tracks on the tape 6 and to stop the tape at a correct location as will now be described.

Figure 3A:
FIGS. 3a to 3d are diagrams representing the signals at various portions of the circuit of FIG. 2 during a step in slow-motion reproduction.
Figure 3B:
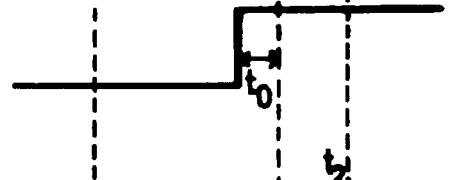
Figure 3C:

FIGS. 3a and 3c respectively represent the control current voltages at wire S1 and the control rotation direction at wire D during a step in slow-motion mode reproduction. This step allows the tape 6 to be drawn from one track to the next at the level of the drum 4. The tape is then stopped while (the same image is replayed and displayed before the next step.

Just before the step, the tape is still; the control current is null (command: 0 V on wire S1).

Figure 3D:
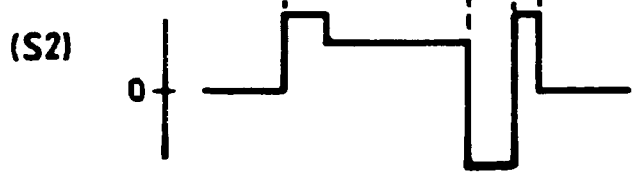

When the step is initiated by the control circuit 20, the control rotation direction (wire D) is set forward (high level—5 V—on FIG. 3c) with a strictly positive control current (command: 4 V then 2 V on wire S1). This result in a strictly positive drive current (wire S2) as represented on FIG. 3d. The capstan motor 12 (and the capstan 10) starts to move and moves forward for a while.

As a possibility and as represented on FIG. 3a, the control current (wire S1) is higher (command: 4 V) at the very beginning of the motion of the capstan motor 12 in order to reach the aimed speed more quickly.

When a control pulse is detected from control pulse sensor 16 (see rising edge—0 V to 5 V—of signal from the control pulse sensor 16 on FIG. 3b), the control circuit 20 waits for a period of time t0—for instance 18 ms—(during which the controls to the capstan motor 12 are unchanged) and starts a stopping phase (which can also be called braking phase or slow-down phase).

The stopping phase comprises successively a first period of time t1 and a second period of time t2, for instance of respectively 14 ms and 2 ms. The duration of each period of time is predetermined and can be recorded for instance in a memory of the VTR.

During the first period of time t1, the control circuit 20 sends the following instruction to the motor 12: control rotation direction is set backward (low level—0 V—on FIG. 3c) with a strictly positive control current (command: 3.5 V on wire S1). This results in a negative drive current (see FIG. 3d) and thus in a torque in the backward direction which acts as a brake on the capstan 10.

During the second period of time t2, the control circuit 20 sends the following instruction to the motor 12: control rotation direction is set forward (high level—5V—on FIG. 3c) with a strictly positive control current (wire S1) which can be the same as during the first period of time, as represented on FIG. 3a, but not necessarily. This results in a sudden positive drive current (see FIG. 3c) and thus in a torque in the forward direction which, after the first period of time t1, allows to stop the motor 12 and thus the capstan 10 accurately.

Notably, this prevents the motor 12 from turning backwards from the first period of time t1. It should be noted that this advantage is of the uttermost importance as the single capstan sensor 14 cannot detect the rotation direction of the capstan 10.

Once the second period of time t2 has elapsed, the control current is set to zero, so that the capstan 10 rests. (When the control current is null, there is no need to indicate the control rotation direction; for instance it can stay forward—high level.) The control circuit 20 stays idle waiting for the next step.

Of course, the invention is not limited to the embodiment described above. For instance, though the above description relates to slow-motion reproduction, the invention also applies to the stopping phase of a still-picture reproduction mode.

Similarly, the direction mentioned as forward is the rotation direction before the stopping phase is initiated, but does not necessarily relate to the evolution of the video sequence: this process can notably be used for so-called reverse slow-motion. Of course, in this last case, the voltages at wire D are inverted compared with the example described above.

What is claimed is:

1. A method for controlling a capstan in a video tape recorder, the capstan being driven by a motor and drawing a tape from which a video signal is reproduced, including the following successive steps:

rotating the capstan in a first direction;

applying a torque to the capstan in a second direction opposite the first direction for a first predetermined period of time;

applying a torque to the capstan in the first direction for a second predetermined period of time;

nullifying the motor current, wherein:

during the first and second periods of time the control current is strictly positive;

during the first period of time the control rotation direction is set backward; and, during the second period of time the control rotation direction is set forward.

2. The method according to claim 1, wherein the first period of time lasts longer than 5 times the second period of time.

3. The method according to claim 1, wherein the second period of time lasts between 0.5 ms and 5 ms.

4. The method according to claim 1, wherein the second period of time lasts between 1 ms and 2 ms.

5. The method according to claim 1, wherein the first period of time lasts between 5 ms and 25 ms.

6. The method according to claim 1, wherein the first period of time lasts between 12 ms and 16 ms.

* * * * *